United States Patent
Manning

(10) Patent No.: US 7,843,411 B2
(45) Date of Patent: Nov. 30, 2010

(54) REMOTE CHOLESTERIC DISPLAY

(75) Inventor: William Manning, Fairport, NY (US)

(73) Assignee: Manning Ventures, Inc., Fairport, NY (US)

( * ) Notice: Subject to any disclaimer, the term of this patent is extended or adjusted under 35 U.S.C. 154(b) by 1036 days.

(21) Appl. No.: 11/333,888

(22) Filed: Jan. 18, 2006

(65) Prior Publication Data
US 2007/0164980 A1 Jul. 19, 2007

(51) Int. Cl.
*G09G 3/36* (2006.01)

(52) U.S. Cl. .......................................... 345/87

(58) Field of Classification Search ............... 345/87, 345/97, 168–169; 349/175, 113
See application file for complete search history.

(56) References Cited

U.S. PATENT DOCUMENTS

| | | | |
|---|---|---|---|
| 3,680,950 A | 8/1972 | Haas et al. | |
| 5,200,845 A | 4/1993 | Crooker et al. | |
| 5,437,811 A | 8/1995 | Doane et al. | |
| 5,453,863 A | 9/1995 | West et al. | |
| 5,523,776 A | 6/1996 | Hougham et al. | |
| 5,570,216 A * | 10/1996 | Lu et al. ..................... | 349/175 |
| 5,625,477 A | 4/1997 | Wu et al. | |
| 5,644,330 A | 7/1997 | Catchpole et al. | |
| 5,668,614 A | 9/1997 | Chien et al. | |
| 5,695,682 A | 12/1997 | Doane et al. | |
| 5,748,277 A | 5/1998 | Huang et al. | |
| 5,990,995 A | 11/1999 | Ebihara et al. | |
| 6,034,752 A | 3/2000 | Khan et al. | |
| 6,118,426 A | 9/2000 | Albert et al. | |
| 6,133,895 A | 10/2000 | Huang | |
| 6,252,564 B1 | 6/2001 | Albert et al. | |
| 6,320,563 B1 | 11/2001 | Yang et al. | |
| 6,327,482 B1 | 12/2001 | Miyashita | |
| 6,348,908 B1 | 2/2002 | Richley et al. | |
| 6,377,321 B1 | 4/2002 | Khan et al. | |
| 6,474,816 B2 | 11/2002 | Butler et al. | |
| 6,483,563 B2 | 11/2002 | Khan et al. | |
| 6,518,944 B1 * | 2/2003 | Doane et al. ................. | 345/87 |
| 6,532,052 B1 | 3/2003 | Khan et al. | |

(Continued)

FOREIGN PATENT DOCUMENTS

JP 4-362917 12/1992

(Continued)

OTHER PUBLICATIONS

Luo, F.C.: "Active Matrix LC Displays", Liquid Crystals, Applications and Uses, vol. 1, Chapter 15, 1990.

(Continued)

*Primary Examiner*—Quan-Zhen Wang
*Assistant Examiner*—Shaheda A Abdin
(74) *Attorney, Agent, or Firm*—Pearne & Gordon LLP

(57) ABSTRACT

A remote display for use with a portable electronic communications device such as a cell phone is disclosed to provide information on a larger remote reflective cholesteric display. The portable communications device may connect with the remote display by wire or wirelessly. The remote display is separate from the portable communications device but can interact with it. Moreover, the remote display may serve multiple purposes, such as providing a user interface, displaying images, and collecting solar power whereby a photovoltaic material behind the display generates electrical energy from light incident on the cholesteric liquid crystal material.

39 Claims, 10 Drawing Sheets

U.S. PATENT DOCUMENTS

| | | |
|---|---|---|
| 6,574,488 B2 | 6/2003 | Oba et al. |
| 6,640,113 B1 | 10/2003 | Shim et al. |
| 6,654,080 B1 | 11/2003 | Khan et al. |
| 6,775,560 B2 | 8/2004 | King et al. |
| 6,816,138 B2 | 11/2004 | Huang et al. |
| 6,819,310 B2 | 11/2004 | Huang et al. |
| 6,850,217 B2 | 2/2005 | Huang et al. |
| 7,009,666 B2 | 3/2006 | Khan et al. |
| 7,206,044 B2 * | 4/2007 | Li et al. .................. 349/113 |
| 7,236,151 B2 | 6/2007 | Doane et al. |
| 2002/0085175 A1 | 7/2002 | Butler et al. |
| 2002/0090980 A1 * | 7/2002 | Wilcox et al. ............... 455/566 |
| 2002/0115477 A1 | 8/2002 | Singh |
| 2002/0121970 A1 | 9/2002 | Brewer |
| 2002/0151283 A1 | 10/2002 | Pallakoff |
| 2003/0034934 A1 | 2/2003 | Brewer |
| 2003/0071791 A1 | 4/2003 | Hanson et al. |
| 2003/0093503 A1 * | 5/2003 | Yamaki et al. ............. 709/220 |
| 2003/0109286 A1 | 6/2003 | Hack et al. |
| 2003/0144034 A1 | 7/2003 | Hack et al. |
| 2003/0148752 A1 | 8/2003 | Chen |
| 2003/0148799 A1 | 8/2003 | Chen |
| 2003/0153363 A1 | 8/2003 | Kuwazoe |
| 2003/0160767 A1 | 8/2003 | Wong et al. |
| 2003/0236102 A1 | 12/2003 | Kawai et al. |
| 2004/0041800 A1 | 3/2004 | Daniels |
| 2004/0061684 A1 * | 4/2004 | Tortola ...................... 345/169 |
| 2004/0132507 A1 | 7/2004 | Shibuya |
| 2004/0137967 A1 | 7/2004 | Bodley |
| 2004/0157642 A1 | 8/2004 | Lee et al. |
| 2004/0162028 A1 | 8/2004 | Glover |
| 2004/0174395 A1 | 9/2004 | Liu |
| 2005/0001797 A1 | 1/2005 | Miller, IV et al. |
| 2005/0083284 A1 | 4/2005 | Huang et al. |
| 2005/0129385 A1 * | 6/2005 | Speasl et al. .................. 386/46 |
| 2005/0162606 A1 | 7/2005 | Doane et al. |
| 2005/0195354 A1 | 9/2005 | Doane et al. |

FOREIGN PATENT DOCUMENTS

| | | |
|---|---|---|
| WO | 2005/072447 | 8/2005 |
| WO | 2005/072455 | 8/2005 |
| WO | 2005/081779 | 9/2005 |

OTHER PUBLICATIONS

Doane, J. William and Khan, Asad: "Cholesteric Liquid Crystals for Flexible Displays", Flexible Flat Panel Displays, Chapter 17, 2005.
Society for Information Display Digest of Technical Papers, vol. XXXIV, pp. 1446-1449, May 2003.

* cited by examiner

REMOTE CHOLESTERIC DISPLAY

BACKGROUND

Handheld devices such as cell telephones and personal digital assistants (PDAs) are limited by the relatively small size of the display screen. The handheld device is generally small and compact. Correspondingly, the size of the display screen is also small. Space is only available on the screen to display abbreviated or simplistic content. For example, a cellular telephone that receives an e-mail is only capable of displaying a few words. It would be impossible to display an entire Web page on these handheld devices. On the other hand, it is inconvenient to carry around and operate a laptop computer for the benefit of its larger display. Most handheld devices are capable of supplying data to display more information if a larger display were available. As a result, recently a number of solutions have been proposed.

U.S. Pat. No. 6,574,488 discloses a terminal that is portable and detachable from a base (such as a cell phone). The terminal has a separate, larger display. Data exchange by radio frequency (RF) is made possible between the base and the terminal, and e-mail or facsimile data that is received by the base through a telephone circuit is stored in the terminal. A user can remove the terminal from the base and carry it to his room, and display stored e-mail messages or facsimile data there. Similarly, U.S. Pat. No. 6,640,113 discloses an integrated system including a radiotelephone and a touch sensitive display that electronically communicates with the radiotelephone, which can be stored within a slot provided in the radiotelephone housing. The display is removable from the slot for use and communicates with the radiotelephone through a cable or a wireless connection. The separate display may be removable from the cell phone, and may communicate via RF means. A similar concept is disclosed in U.S. Pat. No. 6,327,482 where a mobile radio apparatus includes a display and connector on one side. An auxiliary display is removably connected to the side of the apparatus body with the terminal portion mating with the connector portion of the apparatus body. The auxiliary display connected to the apparatus body assists the main display in displaying data at the time of transmission or receipt. When the apparatus is carried by the user, the auxiliary display is dismounted from the apparatus body.

In order to increase the portability for more convenient handheld operation other solutions have been proposed. U.S. Patent Application 2003/016076 discloses a wireless detachable display for a handheld computing device or cell phone. In order to be more mobile, the display system includes a first power source for the processing unit, and a second power source for the visual display. In one embodiment, the processing unit is attached to the user's belt and as such can include a larger battery. This has the advantage of increasing the battery life of the handheld device containing the display. The visual display is physically separable from the processing unit while displaying information according to communications from the processing unit between the visual display transceiver and the processing unit transceiver.

In order to make a larger display less cumbersome to carry around, U.S. Patent Application 2003/0144034 proposes an interactive, collapsible, multi-media display system for use as a hand-held, portable communications device. The housing containing the display is shaped like a large pen. When the display is not being used, the '034 patent application discloses that it can be rolled up inside the pen housing and unrolled for viewing. The device housing can contain a processor, radio transceiver for transmitting and receiving radio signals, along with a collapsible display that is mechanically coupled to the housing and electrically coupled to the processor. The display can have a surface area that is larger than any cross-sectional area of the housing. The processor can be adapted to extract display data from input radio signals, and to provide a representation of the data to the display. The '034 patent application discloses that an organic light emissive device (OLED) is used for this collapsible device.

Various display technologies have been proposed for the large auxiliary display. Since the display is remote from the small handheld device it needs to either supply its own power or receive power from some other unit. All displays require power, some considerably more than others; and the larger the display is the more power it requires. Power can therefore be an overriding issue in the adaptation of a display technology for a remote display device or a portable communications device. Emissive displays such as OLEDs or backlit displays such as backlit LCDs, which have been proposed for use as remote displays, are undesirable in that they consume a lot of power in generating the light. OLEDs are not bistable. They require continuous application of a voltage in emitting light. OLEDs do not reflect light with the liquid crystal of the display. For many handheld applications OLEDs can further be undesirable because they can be hard to see in bright sunlight.

U.S. Pat. No. 6,348,908 discloses a bistable, reflective gyricon technology used in a remote display powered only by ambient energy. Ambient energy is collected by an ambient energy receiver such as a solar panel that converts the ambient energy into electrical power to operate the controller and the display. Ambient energy can be visible light, and can also be non-visible energy such as, for example, the infrared portion of the electromagnetic spectrum. If a solar cell is used, it must be of sufficient size to generate the desired power. There must be sufficient area on the remote device to contain both the solar panel and the separate components of the display which itself can occupy significant area. In order for the gyricon display to offer high resolution required to display text, images and graphics it employs an active matrix backplane, which adds considerable cost to the device.

Another bistable reflective display technology is disclosed in U.S. Pat. Nos. 6,252,564 and 6,118,426. These devices feature an electrophoretic display that is both powered and controlled using radio frequencies. The system includes an antenna, passive charging circuitry, an active control system, a display, and an energy storage unit. There is also a separate transmitter that provides remote power for the display. The system is meant to be used anywhere it is useful to provide intermittent updates of information. Like the gyricon technology, the electrophoretic technology in these patents employs an active matrix for a high resolution display to show detail required in quality text, photos and graphics, which increases the cost of the display.

While these technologies propose using a remote display device as an auxiliary display to a small handheld device, there remains to be a solution wherein the remote display device: can power itself; does not need extra area on the device to contain a solar panel; does not need an extra transmitter to supply power; does not require an active matrix and resulting increased cost and complexity of the device; and/or is flexible so as to be conformable, rugged and, for example, operational despite being rolled or folded up for easy carrying, while having low power requirements.

DISCLOSURE OF THE INVENTION

The invention features a remote display device connected by wire or wirelessly to a smaller portable electronic communications device (e.g., a cell phone) that is not able to produce images that are large enough to be conveniently viewed or that produces no images at all. The larger remote display device is separate from the portable communications device but interacts with it. The remote display device receives information from the small portable communications device including visual information such as e-mail or graphics. Graphics or e-mail having too much text, which are too small to be easily read on the small screen of the portable communications device, can be read or viewed on the larger remote display. The remote display can also send information to the portable communications device.

For example, a businessperson who is traveling and using a personal digital assistant (PDA) might receive a lengthy e-mail or might download extensive graphics. Much of this information may be difficult or impossible to observe on the small display of the PDA. According to the invention, the lengthy e-mail message or downloaded information is forwarded to the remote display and easily viewed in its entirety. The remote display can also be a handheld or body worn device, which can be self-powered. Moreover, as discussed in more detail below, the portable communications device can be recharged using solar power generated by the remote display.

A unique feature of the inventive remote display device is that the display also may serve as a solar panel to enable the remote display device to be totally self-powered as well as to provide power to the portable communications device (e.g., to a cell phone). This unique use of cholesteric liquid crystal display technology offers a solution to the significant problem of power consumption of handheld display devices while also being capable of supplying power to the larger remote display devices that interact with them.

The remote display can include either glass, plastic or fabric substrates. It can be rigid or flexible, even drapable. The remote display need not be stationary but could be a portable device that is handheld or body worn. For many years the material of choice for the substrates of liquid crystal displays was glass. The display included a sandwich of two glass substrates containing the liquid crystal layer between them. Efforts have been made to use more flexible plastic substrates in liquid crystal displays. Such displays may be bent and are much more flexible than glass. However, a low power, drapable liquid crystal display has only recently been achieved in one of the Related Applications listed above. This aspect of the invention has many applications. Rather than being included in clothing as a fairly rigid patch, because the display is drapable it may itself form an entire article of clothing or any portion thereof. In general, the substrate is selected from the group consisting of a textile fabricated from natural or synthetic fibers, a sheet of polymeric material, paper and combinations thereof. The remote display may be rolled or folded for convenience in carrying or compact storage, body worn or sewed or zippered into a garment.

The present invention uses reflective cholesteric liquid crystal display technology. Being bistable, this technology is characterized by having very low power requirements in that an image can be displayed for an indefinite period of time without any applied power. Power is only required to change the image. Furthermore, the bistability comes with a voltage threshold in the driving characteristic such that a simple passive matrix display can be addressed allowing for high resolution displays of low cost. Of great importance for self-powering, the cholesteric material selectively reflects light of a preselected wavelength and bandwidth and is transmissive to other wavelengths extending from the ultraviolet to the near infrared region. This feature uniquely allows the display to overlay a solar panel so that the light that is not reflected by the image is absorbed in the solar panel for conversion to electrical energy. In this device, the solar panel does not take up any extra area but is part of the display itself. The solar cell could even be used as a substrate of the display on which the other display components, including the liquid crystal layer and electrodes, are disposed (e.g., printed, coated, laminated or formed and transferred). The low-power consumption and light efficiency of the remote display allow it to be totally self-powered by the solar panel.

Another aspect of the present invention is an active matrix remote cholesteric liquid crystal display including a plurality of pixel electronics each comprised of one or more transistors, diodes, storage capacitors and suitable circuitry therefor as described in *Liquid Crystals, Applications and Uses*, Chapter 15, Vol. 1, Copyright 1990 by World Scientific Publishing, Edited by Birendra Bahadur, which is incorporated herein by reference in its entirety.

The self-powered remote display device generates electrical power even while it is being read. With an energy storage capability and in view of its larger size than the portable communications device, the remote display device can generate more power than is used by the remote display device and its drive and control electronics. This power is therefore available for other devices such as the mother portable communications device (e.g., cell phone or PDA).

The remote display device could include a touch pad, keyboard, touch screen or the like to enable the user to have a larger keyboard area, making it easier to both receive and send messages.

A primary function of the larger display is to interact with the smaller portable communications device and serve as its surrogate viewer, transmitter and receiver of e-mail messages and graphics in view of its larger screen and touch pad/keyboard area. The remote display device could be dedicated to the simple function described or could contain additional functionality such as the ability to accept memory cards that could be ROM or EPROM.

A switch or a program in a chip could shut down the smaller display (that would be part of the portable mother device, i.e., cell phone or miniature computer, radio, GPS etc.) when instructed by the remote display. Alternatively, powering of the remote display could be controlled in response to signals from the mother electronics unit. The remote display might always be on or off when the mother device is on or off. A switch/chip function would conserve power on the mother device.

The remote display can be monochrome or full-color. Full color may be achieved by stacking red, green and blue cholesteric liquid crystal displays on top of on another and over the solar panel. Video is possible with the use of an active matrix backplane; however, the time interval for showing video is limited by the power available in that video requires substantial power.

From the standpoint of power and sunlight readability, reflective display technologies have much to offer, particularly in a remote handheld display. Further, if the reflective technologies are bistable, they are even more attractive in that power is not needed to maintain an image on the screen; power is only needed to change the image. One aspect of the remote bistable cholesteric liquid crystal display would also possess stable gray scale states as disclosed in U.S. Pat. Nos. 6,133,895, 5,437,811, 5,453,863, which are incorporated herein by reference in their entireties.

The inventive remote display device comprised of bistable cholesteric liquid crystal material has not been used heretofore in connection with a portable communications device having no display or a small display. In particular, the inventive remote display screen serves not only to provide high resolution images but to collect solar power sufficient to totally power itself and to supply power to the portable communications device. In its use of bistable reflective cholesteric technology, the remote display has very low power consumption as described in U.S. Pat. Nos. 5,437,811, 5,453,863 and 5,695,682, offering a high resolution display screen that does not require a costly active matrix backplane. Cholesteric displays can be produced that will provide monochrome or full-color images. The solar panel that is functional underneath the remote display, supplies power to the portable communications device without taking up extra space on the remote display device. A cholesteric liquid crystal display employing a solar panel is disclosed in U.S. Pat. No. 6,518,944, which is incorporated herein by reference in its entirety.

Moreover, the present invention is unique in that the layer of photovoltaic material of the solar cell can itself form a single substrate of the display, whereby the display components including a dispersion layer of cholesteric liquid crystal material in a polymer matrix, and electrodes on either side of the dispersion layer (e.g., electrodes formed of conductive polymer) can be printed, coated, laminated or formed and transferred, onto the photovoltaic layer without a substrate between the liquid crystal layer and the photovoltaic layer. The term "substrate" as used in this disclosure has the meaning provided in the Ser. No. 11/046,487 application. In this design, the solar cell becomes a component of the cholesteric liquid crystal display, which conserves space and reduces the cost of fabricating the display.

Referring now to particular embodiments of the present invention, a first embodiment features an apparatus for displaying images on a remote bistable reflective cholesteric display, comprising a portable electronic communications device including a device adapted to receive signals corresponding to image information and a device adapted to transmit signals to a remote location. The apparatus also includes a remote display device located at the remote location including a bistable reflective cholesteric display. A device is adapted to receive the signals transmitted to the remote location and a device is adapted to address the cholesteric liquid crystal effective to produce images on the cholesteric device based on the image information.

In a second embodiment, an apparatus for displaying images on a remote bistable reflective cholesteric display includes the inventive portable electronic communications device and remote display device. The cholesteric display has a screen area that is at least twice the screen area of the portable communications device. A display screen is defined herein as an external surface of a liquid crystal display of a given area (screen area) that covers all of the pixels of the display. Also included is a photovoltaic device adapted to convert electromagnetic energy to electrical energy. The photovoltaic device is located downstream of the cholesteric display relative to a direction in which ambient light is incident on the remote display device. A device is adapted to store and distribute the electrical energy effective to provide power to the remote display device and portable communication device. This can satisfy the power requirements of the remote display device and the portable communications device. The remote display device and portable communications device preferably include an electrical storage device such as a capacitor or rechargeable batteries. In this case, the photovoltaic device satisfies the power requirements by providing supplemental electrical energy that replenishes the electrical storage device.

A third embodiment of the invention features an apparatus for displaying images on a drapable bistable reflective remote cholesteric display that are received from the inventive portable communications device. The remote display is a drapable bistable reflective cholesteric display having a drapability coefficient (DC) of between 10 and 97% (see the Ser. No. 11/006,100 application for a definition of DC). In all aspects of the present invention the remote location where the remote display is present is separate from the location occupied by the portable communications device. The remote location may be in proximity to the portable communications device. For example, the portable communications device could be a GPS unit carried in a jacket pocket while the remote drapable cholesteric display could be incorporated into a jacket sleeve of the user of the GPS unit. Conversely, the remote location may be even walking or driving distance away, or further, made possible by radio or satellite communication.

A fourth embodiment of the present invention features an apparatus for displaying images on a remote bistable cholesteric display having a single substrate. The apparatus includes the inventive portable communications device and remote display device. The remote display device includes a multi-color, reflective cholesteric display comprising only a single substrate and a multi-layer, light-reflective stack of cholesteric liquid crystal dispersion layers disposed (e.g., printed, coated, laminated or formed and transferred) on the substrate. Each of the dispersion layers includes cholesteric liquid crystal material dispersed in a polymer matrix.

A fifth embodiment of the present invention features an apparatus for displaying images on a drapable bistable remote cholesteric display that are received from the inventive portable communications device. The drapable display device has a housing including a first member and a second member having a concave surface. The first member and second member can be moved relative to each other (e.g., by pivoting about a hinge) between closed and open positions. The concave surface of the second member forms an interior volume of the housing. The drapable cholesteric display has a drapability coefficient of between 10 and 97%. The drapable cholesteric display is adapted to be rolled or folded when contained in the interior volume in the closed position and is adapted to be unrolled or unfolded when removed from the housing in the open position.

Referring now to specific features applicable to the foregoing embodiments, the cholesteric display may include a dispersion layer comprising cholesteric liquid crystal material dispersed in a polymer matrix. The cholesteric display comprises a substrate, the dispersion layer being disposed (e.g., printed, coated, laminated or formed and transferred) on the substrate, a first conducting electrode disposed on a first side of the dispersion layer and a second conducting electrode disposed on a second side of the dispersion layer distal of the substrate. The electrodes are adapted to be connected to the addressing means. The substrate of the drapable display may be a textile fabricated from natural or synthetic fibers, a sheet of polymeric material, paper and combinations thereof. The substrate may form a component of clothing and can be body worn. The drapable cholesteric display has a drapability coefficient (DC) value between 10% and 97%. The drapable display device includes a device adapted to transmit signals to the portable communications device. A device is adapted to activate and deactivate power to the portable communications device or the remote display device responsive to signals transmitted from the other of the portable communications device and the remote display device (e.g., indicative of the activation or deactivation of power of the other device). The portable communications device and the remote display device are adapted to communicate the signals using a medium selected from the group consisting of wire, cable, fiber optics, and electromagnetic radiation at radio, infrared or light frequencies, and combinations thereof. The portable communications device is selected from the group consisting of a cell phone, electronic book, walkie-talkie, personal digital assistant, handheld computer, camera, radio, MP3 player, global positioning device and combinations thereof. The remote display device may also include a data input device adapted to input information using a touch pad, keyboard or voice recognition electronics. A device may be adapted to transmit information that was input to the remote display, by wire or wirelessly, to the handheld communications device. The remote display device includes a device adapted to read information from a memory card. A photovoltaic device is adapted to convert electromagnetic energy to electrical energy, the photovoltaic device being located downstream of the dispersion layer relative to a direction in which ambient light is incident on the cholesteric display. A cholesteric display having a single substrate may utilize the photovoltaic material as the substrate. The apparatus may include a device for storing and distributing the electrical energy to at least one of the portable communications device and the remote display device. The remote display and portable communications device may be completely powered by the electrical energy from the photovoltaic device. The portable communications device may include a rechargeable battery wherein the device for distributing the electrical energy from the photovoltaic device provides the electrical energy to the battery.

Many additional features, advantages and a fuller understanding of the invention will be had from the accompanying drawings and the detailed description that follows. It should be understood that the above Disclosure of the Invention describes the invention in broad terms while the following Detailed Description describes the invention more narrowly and presents embodiments that should not be construed as necessary limitations of the broad invention as defined in the claims.

BRIEF DESCRIPTION OF THE DRAWINGS

FIG. 10 is an illustration of a body worn remote display and handheld portable communications device.

DETAILED DESCRIPTION

Figure 1:
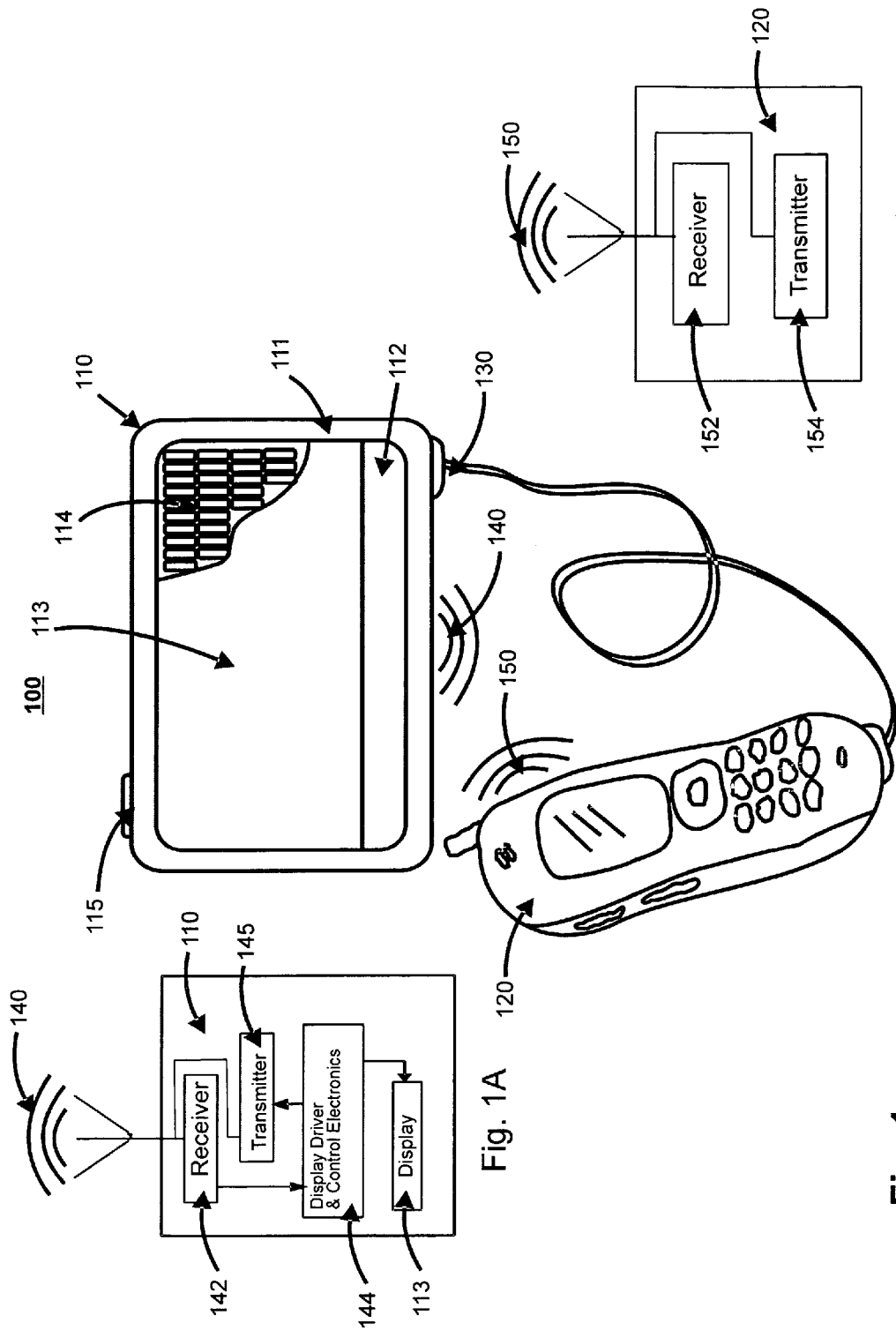
FIG. 1 is a schematic diagram illustrating the self-powered remote display device with touch pad and an optional cable to supply power to a cellular telephone device.

The present invention features an apparatus that includes a remote display device with a larger screen than an associated handheld or otherwise portable communications device. FIG. 1 shows the inventive apparatus 100 including a handheld remote display device 110 with a wireless connection 140 and 150, to a smaller portable electronic communications device, illustrated here as a cellular telephone 120. The device 120 is attached to the remote display 110 through an optional cable 130 that enables power to be supplied to the device 120.

The remote display device 110 includes a cholesteric reflective display 113 adapted to display images such as text messages, documents, calendars, graphics, photographs or other information supplied by the electronic device 120. Device 120 can be a cellular telephone ("cell phone"), camera, electronic book ("e-book"), personal digital assistant ("PDA"), MP3 player, handheld computer, radio, "walkie-talkie," global positioning system (GPS) or any portable electronic device having a display screen that is too small or inconvenient to read or even absent from the device.

The cholesteric display 113 includes electrodes that are connected to electronic drivers for supplying signals to the display. In its most common form, the electrodes include rows and columns that form a matrix of pixels as is common in the art of liquid crystal and other flat panel display technologies as disclosed, for example, in U.S. Pat. Nos. 5,644,330 and 5,625,477, which are incorporated herein by reference in their entireties. A cholesteric liquid crystal material is sandwiched between the rows and columns of electrodes. Such a matrix is sometimes referred to in the art as a passive matrix. There are several types of cholesteric display technologies to be described later. In one bistable type, a passive matrix may be electronically multiplexed so that a high resolution image can be addressed on a matrix of a large number of rows and columns limited only by the writing time of an image. One set of electrodes, specifically those rows (or columns) proximal to the viewing side of the display, are transparent conductors such as provided by the conducting materials: indium tin oxide (ITO), conducting polymers or other transparent conductive materials. The display may possess only a single substrate or two or more substrates. In the case of two substrates, one set of electrodes (rows or columns) is printed or otherwise patterned and attached to one substrate while the other set (columns or rows) is printed or otherwise patterned and attached to the other substrate. In the case of a single substrate, one set of electrodes is on the substrate while the other set is printed or otherwise coated and etched over the cholesteric material. The cholesteric material may be in the form of a dispersion of droplets in a polymer matrix; as a result, overcoatings are possible as described, for example, in the published book, J. W. Doane and A. Khan, *Flexible Displays* (Ed. G. Crawford) John Wiley and Sons, England, Chapter 17 (2005).

The remote display device could be powered by a battery and photovoltaic device. A battery charger or power adapter could be used to recharge the device. The electrical power of the remote display device could be supplied entirely by a photovoltaic material (e.g., when the device has no battery or power supply) or supplemented by a photovoltaic material (e.g., when the device includes a rechargeable battery), which could be included as part of the device. The photovoltaic source could also supplement the power of the portable communications device, such as by providing electricity to its battery.

In a particular embodiment, underneath the remote cholesteric liquid crystal display 113, from the point of reference of the direction that ambient light is incident on the display, is a solar panel 114. The remote cholesteric liquid crystal display is intrinsically reflective in that the cholesteric liquid crystal molecules themselves reflect a portion of incident light so as to form images on the remote display. Light that is not reflected by the cholesteric liquid crystal material passes through the display and is available for absorption in the solar panel for conversion to electrical energy. The electrical energy generated is stored in a capacitor or rechargeable battery. The latter is preferred in that it is capable of storing substantially more energy at the desired voltages. The storage battery or capacitor and associated power control electronics are located inside the remote display housing 111 (not shown in FIG. 1). The solar panel supplies power for the remote display and is capable of periodically supplying optional power to its associated electronic device 120 through connection of the optional cable 130. Cable 130 may be detachable from either or both devices 110, 120.

The remote cholesteric liquid crystal display illustrated in FIG. 1 includes an optional touch screen 112 as known in the art that can be transparent and cover all or part of the display screen. This allows the user to input data to the remote display and offers a means for the user to provide command signals to not only the remote display, but also to the cell phone or other electronic device that it is connected to by wire or wirelessly. The user may also provide data to the remote display through a memory card 115 and suitable memory card reader.

The portable communications device 120 is a mother device. It is adapted to send information that will be displayed by the larger remote display. The portable communications device 120 could be a cell phone (as illustrated in FIG. 1) or it could be any other electronic device, for example, camera, e-book, PDA, MP3 player, handheld computer, radio, walkie-talkie or GPS. The portable communications device can be any device having a display screen too small or positioned to conveniently read all the digital information in the device such as e-mail text or graphics. The display screen area of the remote display is advantageously at least twice the display screen area of the portable communications device. A display screen may be absent altogether on the mother portable communications device. The portable communications device may not only possess a small display screen, but also a small battery to ensure that it is not too heavy or bulky. In such a case, electrical power from the remote display can be used to provide charge to the batteries of the portable communications device through the optional power cord 130. Digital information is preferably passed between the remote display 110 and the portable communications device 120 via a wireless connection 140 and 150, for example, BLUETOOTH®. Alternatively, the cord 130 could be used for this purpose when the portable communications device and the remote display are proximally located to each other.

Figure 2:
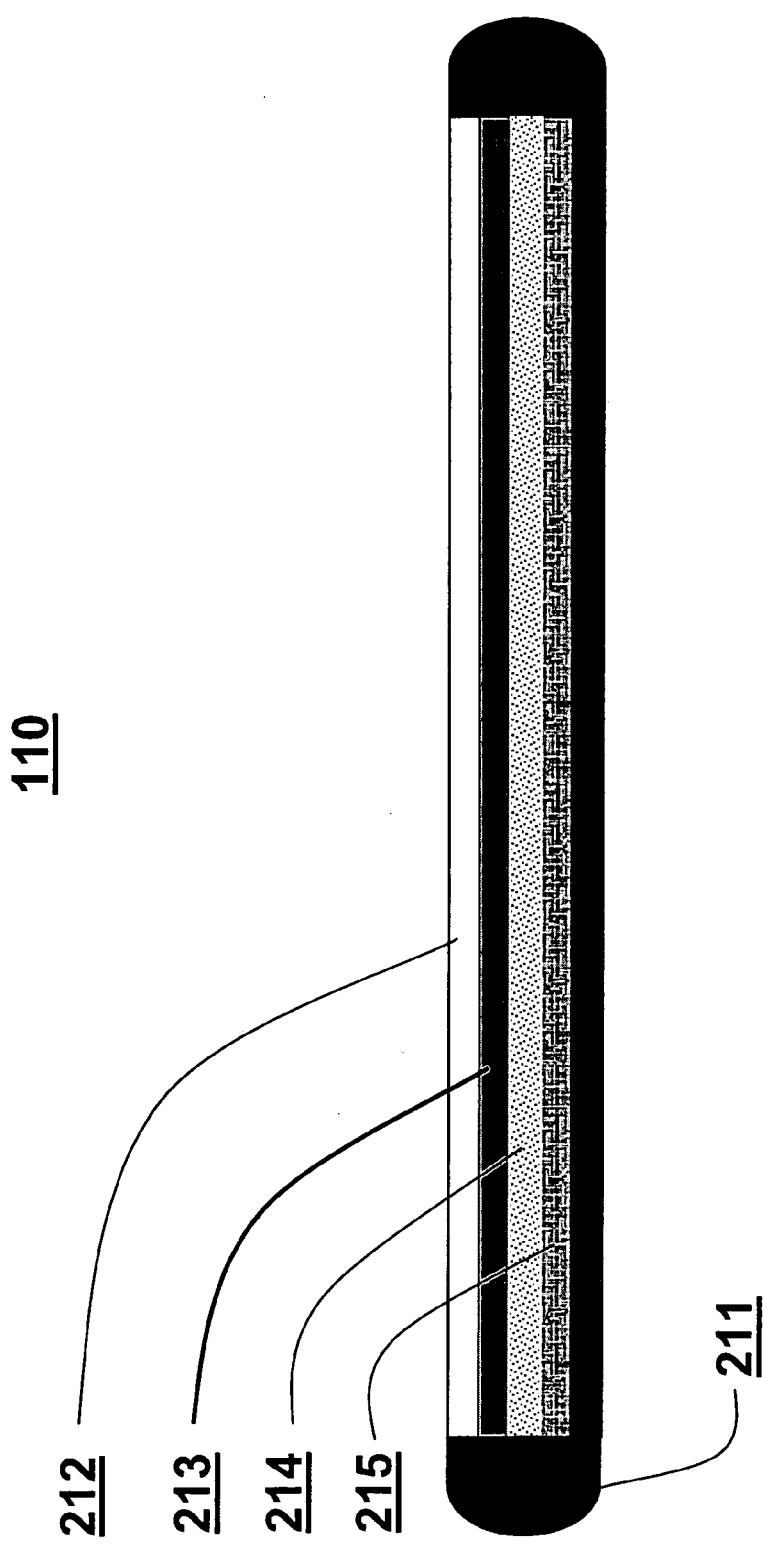
FIG. 2 is a schematic diagram illustrating a side view of the remote display and the various components of a monochrome remote display.

FIG. 2 is an illustration of the side view of the remote display 110 shown in FIG. 1. There are several components of the inventive remote display device with each component illustrated as one layer of a stack of layers in FIG. 2. Starting with the display 213, the display technology is bistable cholesteric liquid crystal technology achieved with cholesteric liquid crystal materials having a positive dielectric anisotropy as described in U.S. Pat. Nos. 5,437,811 and 5,453,863, which are incorporated herein by reference in their entireties. The display 213 includes electrodes that are connected to electronic drivers for supplying signals for driving the display. Typically, the electrodes include rows and columns that form a matrix of pixels as is common in the art of liquid crystal and other flat panel technologies. As described in those patents, this type of cholesteric display can be electronically multiplexed allowing for a high resolution display on a simple, low-cost passive matrix. Being a bistable cholesteric liquid crystal display technology, power is only required to change the image. Once the image is addressed on the bistable cholesteric liquid crystal display, it remains there without any applied power. As a result, the display technology is very power efficient. Such a display can also be made very flexible [J. W. Doane and A. Khan, Flexible Displays (Ed. G. Crawford) John Wiley and Sons, England, Chapter 17 (2005), which is incorporated herein by reference in its entirety].

Other types of cholesteric liquid crystal display technologies can be used for the display 213 in the inventive remote display device. Cholesteric displays with liquid crystal materials having negative dielectric anisotropy such as disclosed in U.S. Pat. Nos. 3,680,950 or 5,200,845, which are incorporated herein by reference in their entireties, may be used. Negative type cholesteric liquid crystal displays can operate in a bistable mode; however, they require further development for high resolution displays. Materials that switch between a negative and positive dielectric anisotropy are disclosed for display operation in U.S. Pat. No. 6,320,563, which is incorporated herein by reference in its entirety.

The next layer in the stack of the remote display device 110 is the solar cell panel 214. Light that is not reflected by the cholesteric display 213 in creating the viewed image is absorbed by the solar panel (Society for Information Display Digest of Technical Papers, Volume XXXIV, May 2003, pp. 1446-1449, which is incorporated herein by reference in its entirety). Electric power generated by the solar panel is collected by a power management circuit and fed to a rechargeable battery, not shown, but contained as part of the circuit board 215 below the solar panel. The output of the solar cell can vary greatly according to the lighting conditions. Therefore, the power management circuit can possess such circuitry as a charge pump and supervisory circuit to maintain a voltage level suitable for charging the battery. The solar panel collects light and generates electrical power even while the remote display is being viewed in that most of the light incident on the cholesteric display 213 passes through the display impinging onto the solar panel 214. The display 213 is a bistable cholesteric liquid crystal display that only reflects light at a pre-selected wavelength and bandwidth. A typical bandwidth is only about 100 nanometers so that most of the light spectrum passes through the display and is available for solar conversion. Details of circuitry and electrical components that may be suitable for using a solar cell with the cholesteric liquid crystal display of the present invention is provided in the U.S. Pat. No. 6,518,944 patent, which is incorporated herein by reference in its entirety.

The circuit board 215 on the bottom of the stack in FIG. 2 contains electronic circuitry as needed for the functioning of the inventive remote display 110. Circuitry on board 215 includes the electronic drive and control circuits for the cholesteric display 213; however, it is understood that some of the drive and control circuitry may be included on the display 213. For example, the drive chips connected to the electrodes may be on the display substrate so that fewer connections are required between the display 213 and the circuit board 215. Furthermore, the drive circuitry and part of the control circuitry may be printed on the display substrate. Also, circuit board 215 contains the power control and distribution circuitry as well as the electronic charge storage device for electrical power received from the solar panel 214. The charge storage device may be a capacitor or a rechargeable battery which can itself be a flat layered device and a layered component in the stack, not shown in FIG. 2.

Circuit board 215 also contains the radio frequency circuits for wireless communication with the mother device 120 of FIG. 1. An example of such circuitry is found in assignee Kent Displays Inc.'s INFO-SIGN™ product (manufactured and sold in Kent, Ohio) in which digital data to be presented on the sign is supplied by wireless communication to the INFO-SIGN™ product, which is incorporated herein by reference. The circuit board 215 may be rigid or flexible. The inventive remote device 110 is entirely self-contained in that the drive circuitry, power management from the solar cell, and RF communication electronics are contained in the device in addition to the software and circuitry to manage a display for operation with the mother device 120 of FIG. 1.

Referring to FIG. 1A, the electronics of the remote display device 110 include: a receiver 142 for receiving signals (e.g., digital signals) containing image data, the signals being transmitted along wireless communication medium 140 from the portable electronics device 120; display drive and control electronics 144; and the display 113. The drive and control electronics 144 generate voltage pulses corresponding to the image data that are sent, for example, to appropriate overlapping electrodes or pixels of a passive matrix display 113, which results in the formation of images on the display. The electronics for the remote display device 110 can also include a transmitter 145 for sending signals (e.g., digital signals) along medium 140, such as to the receiver 152 of the device 120.

The following pertains to drive schemes suitable in all embodiments of the present invention. Conventional driving schemes for bistable passive matrix displays are disclosed in U.S. Pat. Nos. 5,644,330 and 5,625,477, which are incorporated herein by reference in their entireties. The liquid crystal display device of the present invention may employ multi-configuration drive electronics and other components as disclosed in U.S. patent application Ser. No. 10/782,461, entitled "Multi-Configuration Display Driver," filed Feb. 19, 2004, which is incorporated herein by reference in its entirety. Other types of driving voltage schemes can be applied to the rows and columns such as the dynamic drive scheme (U.S. Pat. No. 5,748,277) or the cumulative drive scheme (U.S. Pat. No. 6,133,895), which are incorporated herein by reference in their entireties. Active matrix displays and associated drive electronics suitable for use in the present invention are disclosed below regarding FIG. 7.

Referring to FIG. 1B, the electronics of the portable communications device 120 include a receiver 152 for receiving signals (e.g., digital signals) containing image data along wireless communication medium 150 and a transmitter 154 for sending signals (e.g., digital signals) containing the image data along the wireless communication medium 150 to the receiver 142 of the remote display device.

Referring to FIG. 2, cholesteric display 213 of the remote display device 110 is overlaid with an optically transparent layer 212. Layer 212 is optional and may only be a protective layer or it may serve also as a touch screen for the user of the remote display to input data or instructions.

In one application the remote display, the portable display, or both, are flexible. The display mount 211, circuit board 215, solar panel 214, cholesteric display 213 and transparent cover 212 are flexible so that the remote display can be bent or twisted to conform to some desired shape such as, for example, the curvature of an arm or leg.

Figure 3:
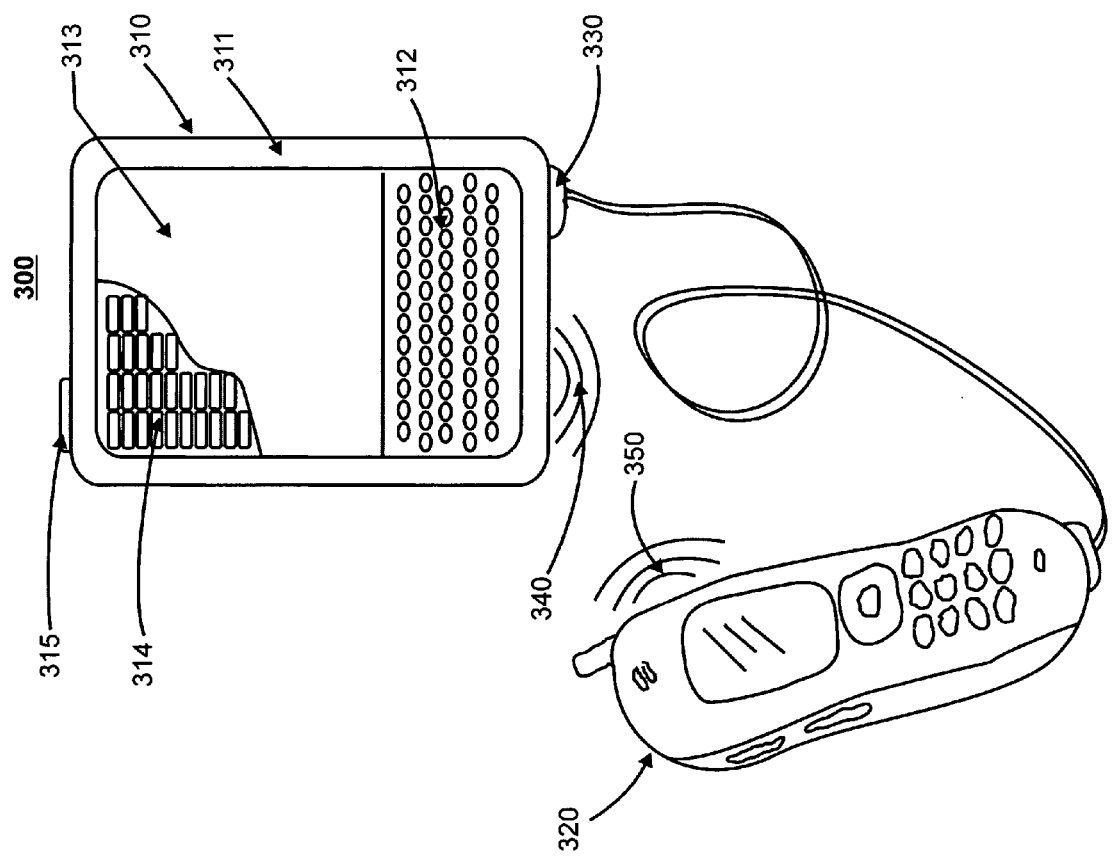
FIG. 3 is a schematic diagram illustrating the self-powered remote display device with keyboard and an optional cable to supply power to a cellular telephone.

In another application, the remote display device incorporates a keyboard that enables the user to input data. FIG. 3 shows the inventive apparatus 300 including a handheld remote display device 310, a keyboard for data entry 312 and a wireless connection 340 and 350, to a portable electronic communications device, illustrated here as a cell phone 320. The device 320 is attached to the remote display 310 through an optional cable 330, which can be used to enable the remote display 310 to supply power to the device 320. The cable can be detachable from either or both devices 310, 320.

The remote display device 310 includes a cholesteric reflective display 313 for displaying images such as text, graphics, photographs or other information supplied by the electronic device 320. The display 313 includes electrodes that are connected to electronic drivers for supplying signals for driving the display. Typically, the electrodes include rows and columns that form a matrix of pixels as is common in the art of liquid crystal and other flat panel display technologies.

Immediately under the cholesteric display 313 is a solar panel 314. Light that is not reflected by the cholesteric display so as to form images, passes through the display and is available for absorption in the solar panel for conversion to electrical energy. The electrical energy generated is stored in a capacitor or rechargeable battery. The latter is preferred in that it is capable of storing substantially more energy at the desired voltages. The storage battery or capacitor and associated power control electronics are located inside the remote display housing 311 (not shown in FIG. 3). The solar panel supplies power for the remote display and is capable for supplying power to the associated portable electronic device 320 through optional cable 330. The keyboard 312 allows the user to input data to the remote display and offers a means for the user to provide command signals to not only the remote display, but also to the mother cell phone or other electronic device that it is connected to by wire or wirelessly. The user may also provide data to the remote display through a memory card 315 and suitable memory card reader.

The mother portable communications device 320 could be a cell phone (as illustrated in FIG. 3) or it could be any electronic device, for example, camera, e-book, PDA, MP3 player, handheld computer, radio, walkie-talkie or GPS, such as an electronic device in which the associated display screen is too small or inconveniently positioned to be read, or absent from the device altogether.

The portable mother device may not only possess a small display screen but also a small battery so that it is not too heavy or bulky. In such a case electrical power from the remote display can be used to provide charge to the batteries of the mother device through the optional power cord 330.

Figure 4:
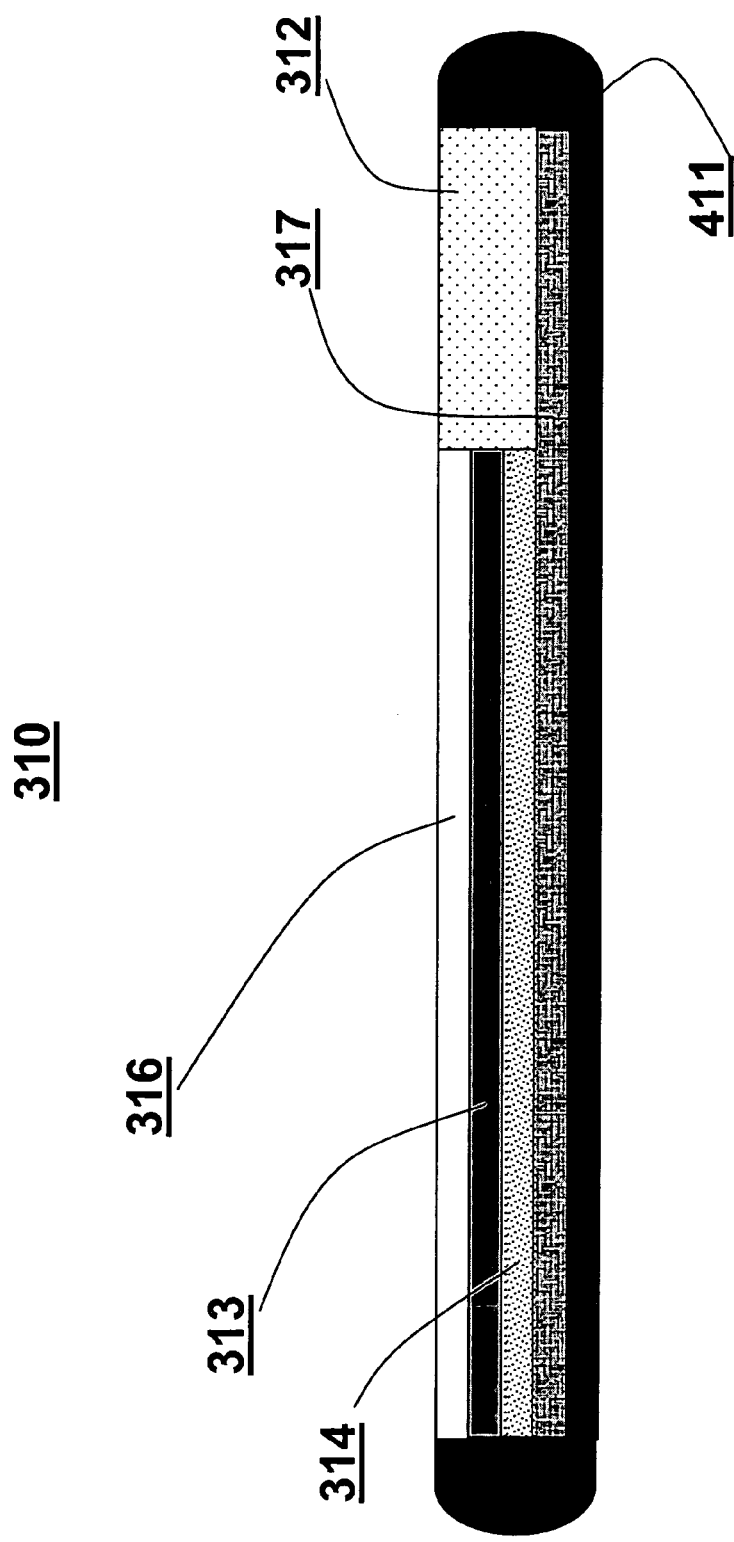
FIG. 4 is a schematic diagram illustrating the side view of the remote display and the various components of a monochrome remote display with data entry board.

FIG. 4 is an illustration of the side view of the remote display device 310 shown in FIG. 3. FIG. 4 illustrates how various components of the remote display device 310 are stacked as seen in the side view. Circuit board 317 on the bottom of the stack contains the electronic drive and control circuitry used for the functioning of the display as well as power control circuitry including the electronic charge storage device, which may be a rechargeable battery or capacitor. Other electronics contained on the board are circuits as required for the radio frequency, infrared, sound or optical communication electronics for communicating with the mother unit. The device is entirely self contained in that drive circuitry, power management and RF communication circuitry are contained in the device in addition to the software and circuitry to manage a display for operation with the mother device (e.g., camera, e-book, PDA, MP3 player, handheld computer, radio, walkie-talkie or GPS).

The circuit board 317 may rigid or flexible. Not all of the circuitry of the remote display needs to be on the circuit board. For example, the drive chips connected to the electrodes of the display may be on the display substrate so that fewer connections are required between the display 313 and the circuit board 317. Furthermore, the drive circuitry and part of the control circuitry may be printed on the display substrate.

The next layer in the stack of the remote display device 310 is the solar panel 314. Light that is not reflected by the display 313 in creating the viewed image is absorbed by the solar panel. Electric power generated by the solar panel is collected by a power control circuit and fed to a rechargeable battery, not shown but contained as part of the circuit board 317 below the solar panel. The solar panel collects light and generates electrical power even while the remote display is being viewed in that most of the light incident on the display 313 passes through the display impinging onto the solar panel 314. The display 313 is a cholesteric display that only reflects light at a pre-selected wavelength and bandwidth. A typical bandwidth is only about 100 nanometers so that most of the light spectrum passes through the display and is available for solar conversion.

Remote display 310 is equipped with a data entry board 312 that could be a keyboard, touch panel or some other data entry device. The cholesteric liquid crystal display 313 in the remote display device 310 is overlaid with an optional optically transparent layer 316. Layer 316 can serve as a protective layer, antireflective or other layer designed to improve the optical and/or mechanical properties of the remote device.

It should be appreciated that the remote display device 310 may be flexible. The display housing 411, circuit board 317, solar panel 314, cholesteric liquid crystal display 313 and transparent cover 316 are flexible so that the remote display device can be bent or twisted to conform to some desired shape such as, for example, the curvature of an arm or leg.

Figure 5:
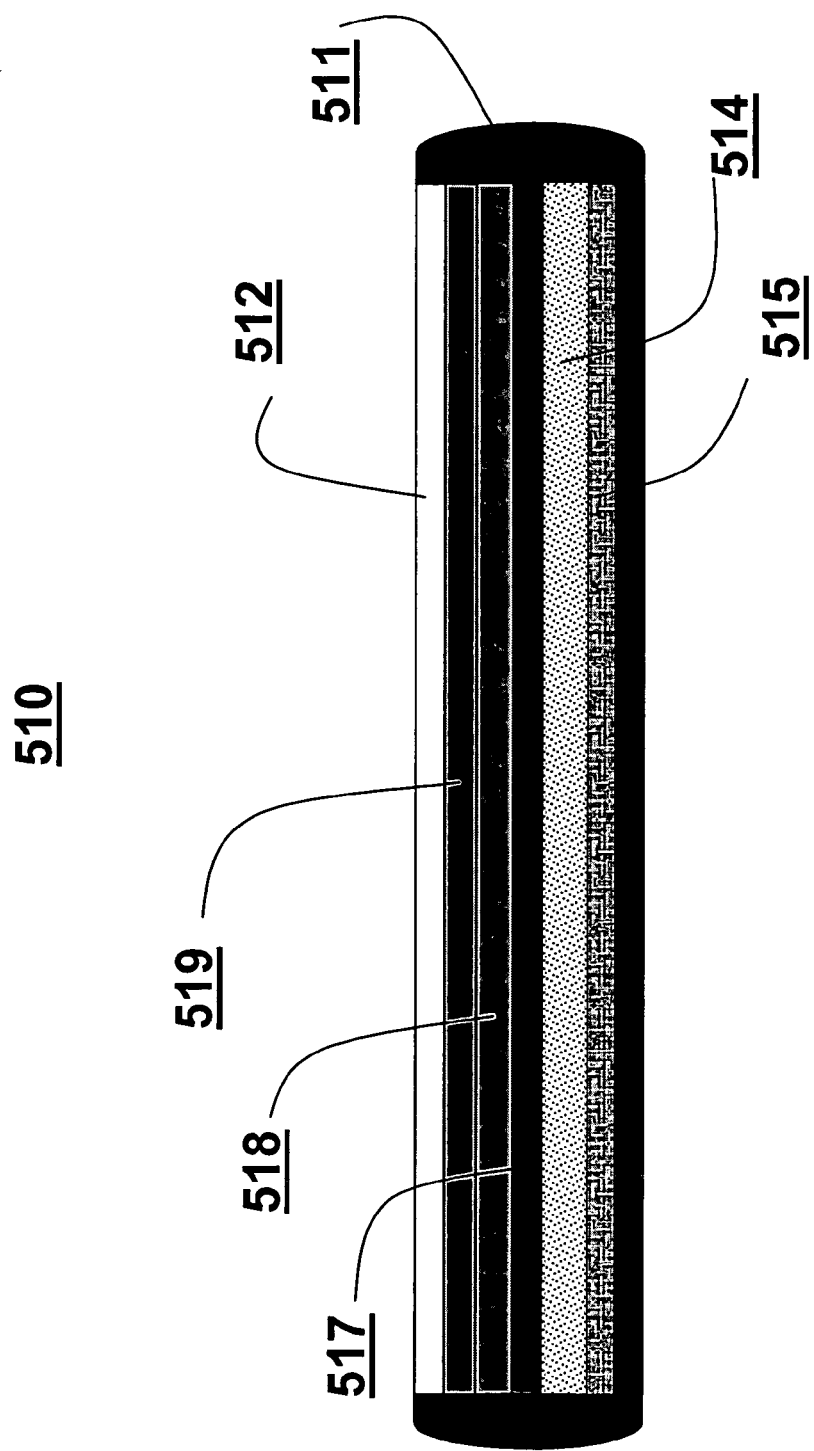
FIG. 5 is a schematic diagram illustrating a remote display with display elements for multiple color images and high brightness.

FIG. 5 illustrates a remote display device 510 with display elements for multiple color images and high brightness. A side view of the remote display device 510 illustrates how the various elements are stacked. Starting with the viewed side of the remote display device, an optional optically transparent layer 512 protects the display from the environment and provides the optimal optics to best observe images and provide optimal solar light collection. High reflective brightness is achieved by stacking a red reflective cholesteric liquid crystal display 519 over a green reflective cholesteric liquid crystal display 518, over a blue reflective cholesteric liquid crystal display 517 as disclosed in U.S. Pat. Nos. 6,377,321 and 6,654,080, which are incorporated herein by reference in their entireties. An underlying solar panel 514 collects remaining light not used in the creation of the color image displayed on the remote display screen. The circuitry to manage the generated electric charge as well as the storage battery is located on the circuit board 515. Electronic drive and control circuitry for the color display is located entirely on the circuit board 515 or shared between the circuit board and the substrates of the red, green and blue displays, 519, 518 and 517, respectively.

It should be appreciated that the red, green and blue displays may be fabricated by coating, printing, laminating, or forming and transferring, the display elements directly on the solar panel as disclosed in U.S. patent application Ser. No. 11/046,487 without a substrate between a liquid crystal layer and the solar panel and even without substrates between liquid crystal layers. This approach is based on use of the dispersion of cholesteric liquid crystal in a polymer matrix and transparent conducting polymers as bottom and top electrodes. Encapsulation of cholesteric liquid crystal droplets in a polymer matrix and mechanical flexibility of the conducting polymers allows the creation of durable and highly flexible cholesteric liquid crystal displays. These displays are fabricated from bottom-up by sequential coating or printing of various functional layers on various substrates. Coating the displays or a portion of the displays on a release film with subsequent transfer to the solar panel is also possible as disclosed in International Appl. No.: PCT/US2005/003144, which is incorporated herein by reference in its entirety.

Figure 6:
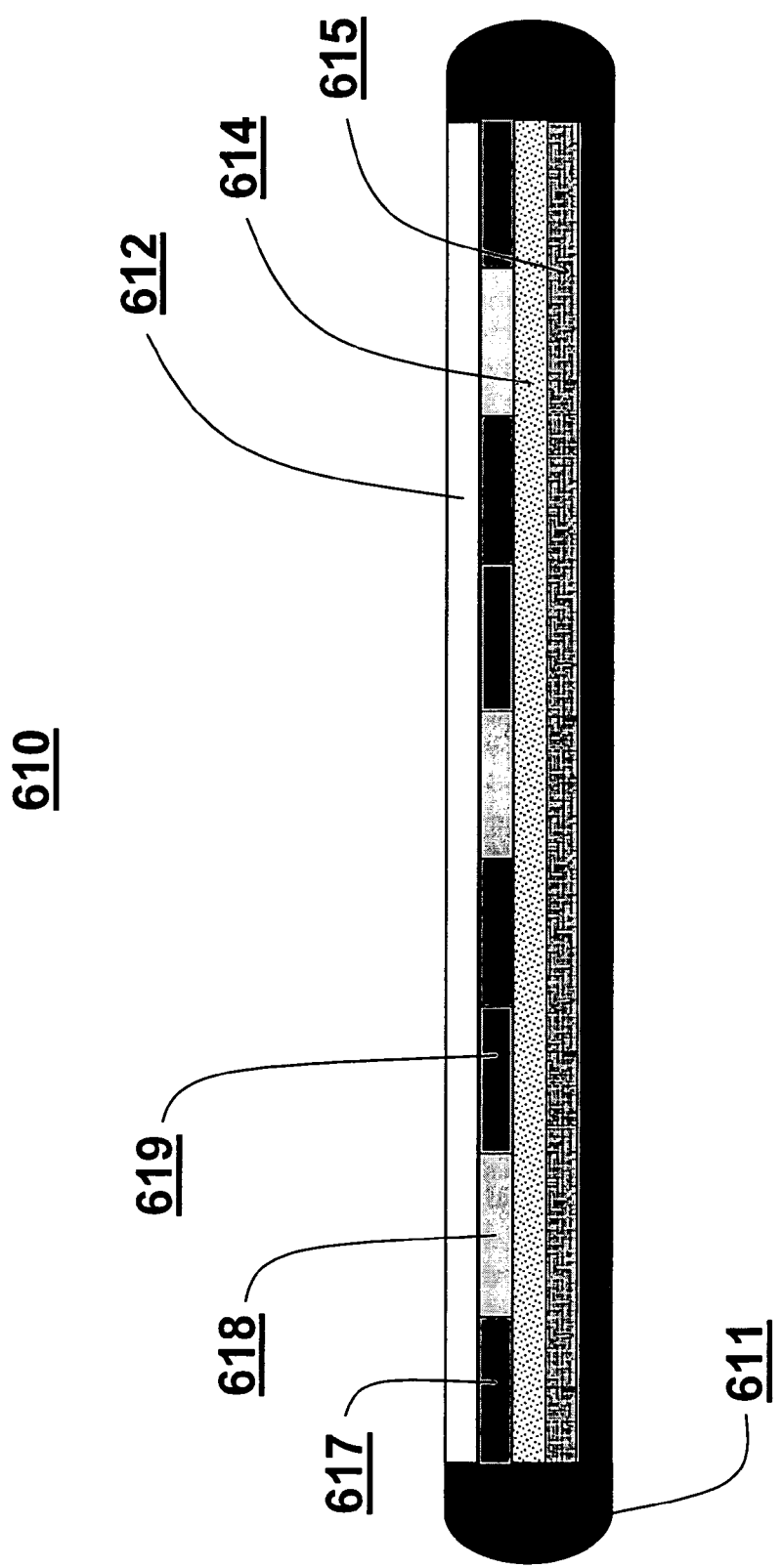
FIG. 6 is a schematic diagram illustrating a remote display with display elements for multiple color images with low power consumption.

FIG. 6 is a block diagram illustrating a remote display device 610 with display elements for multiple color images with lower power consumption. This illustrates how the colors are patterned in a single layer display. Starting with the viewed side of the remote display an optional optical transparent layer 612 serves to protect the display from the environment and provides optical matching to best observe images and provide optimal solar light collection. Lower power consumption for a multiple color display comes at the sacrifice of reflective brightness and is achieved by patterning the pixels of the display in red 619, green 618, and blue 617, rows (or columns) as disclosed in U.S. Pat. No. 5,668,614, which is incorporated herein by reference in its entirety. It will be appreciated that FIG. 6 only shows a few such rows (or columns) for simplicity but that an actual display is of higher resolution and may contain several hundred such rows (or columns) such as a VGA display containing 480 rows (or 640 columns). An underlying solar panel 614 collects remaining light not used in the creation of the color image displayed on the remote display screen. The circuitry to manage the generated electric charge as well as the storage battery is located on the circuit board 615. Electronic drive and control circuitry for the color display is located entirely on the circuit board 615, or shared between the circuit board and the substrates of the red, green, and blue patterned display.

Figure 7:
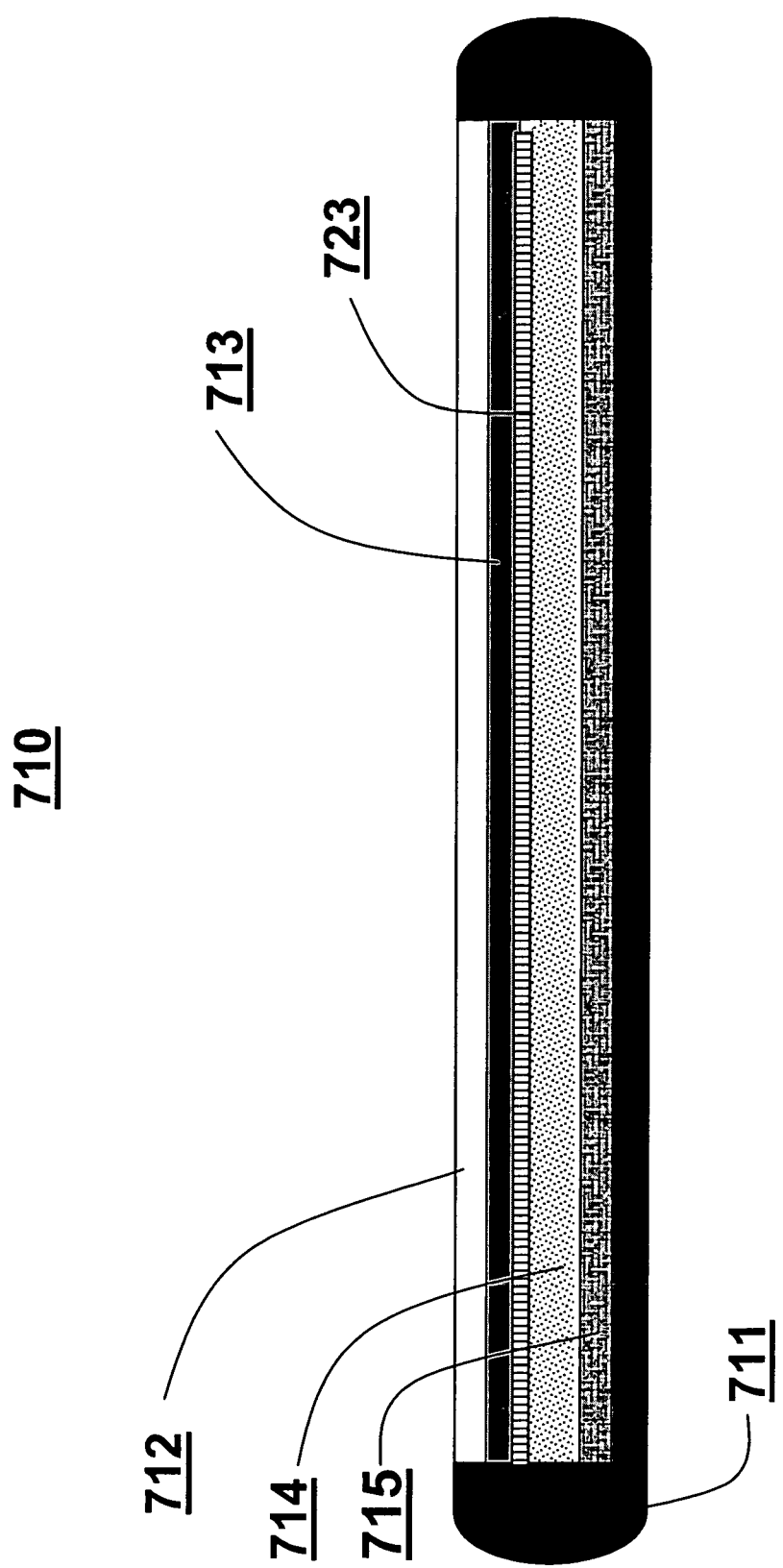
FIG. 7 is a schematic diagram illustrating a remote display with an active matrix that can display video rate images.

Referring to FIG. 7, cholesteric liquid crystal display 713 of the remote display device 710 is overlaid with an optically transparent layer 712. Layer 712 is optional and may only be a protective layer or serve also as a touch screen for the user of the remote display to input data or instructions. The substrate 723 of the display 713 is an active matrix substrate as known in the art as disclosed in U.S. Pat. Nos. 6,819,310; 6,816,138; and 6,850,217 and in *Liquid Crystals, Applications and Uses*, Chapter 15, Vol. 1, Copyright 1990 by World Scientific Publishing, Edited by Birendra Bahadur, which are incorporated herein by reference in their entireties. The circuit board 715 on the bottom of the stack contains the electronic drive and control circuitry used for the functioning of the active matrix display as well as power control circuitry, electronic charge storage device and radio frequency circuitry for a wireless connection to the mother unit.

The remote display device 710 is powered by the solar panel 714. Light that is not reflected by the display 713 in creating the viewed image is absorbed by the solar panel. Electric power generated by the solar panel is collected by a power control circuit board 715 below the solar panel. The solar panel collects light and generates electrical power even while the remote display device is being viewed in that most of the light incident on the display 713 passes through the display impinging onto the solar panel 715. The display 713 is a bistable cholesteric liquid crystal display that only reflects light at a pre-selected wavelength and bandwidth.

It should be appreciated that the remote display device 710 may be flexible. The display housing 711, circuit board 715, solar panel 714, cholesteric display 713 with substrate 723 and transparent layer 712, are flexible so that the remote display device can be bent or twisted to conform to some desired shape such as, for example, the curvature of an arm or leg.

In fact, the remote display itself can form the material used to make the clothing or other fabric construct. A remote cholesteric display with the drapability of cloth provides a new dimension to liquid crystal display technology enabling display applications that were not possible before such as conforming to three-dimensional structures or flexing and folding with the garment containing the display. To this end, the remote cholesteric display according to the invention is operatively deformable, meaning that it will function even though it is or has been deformed. In preferred applications, the remote cholesteric display according to the invention will be operatively drapable such that it can have folds and possess a measurable drape coefficient. The formability of a fabric can be defined as its ability to re-form from a two-dimensional shape to a simple or complex three-dimensional shape. The drape coefficient is used to describe the degree of 3D deformation when the fabric specimen is draped over a drape meter as defined in U.S. patent application Ser. No. 11/006,100, which is incorporated herein by reference in its entirety. The display electrodes, cholesteric layer and associated materials are coated, printed or laminated, and suitably patterned, on the drapable substrate in a manner disclosed in U.S. patent application Ser. No. 11/006,100.

Figure 8:
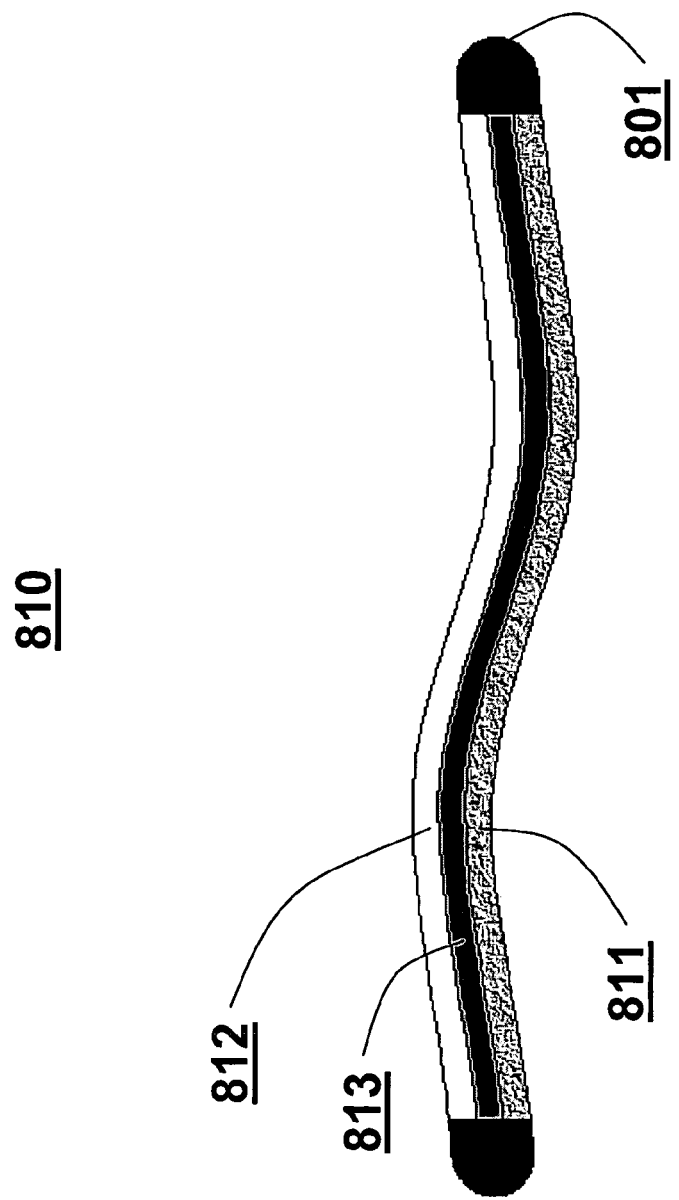
FIG. 8 is a schematic diagram illustrating a remote display on a fabric substrate.

Referring to FIG. 8, a drapable remote display device 810 is illustrated in which the drapable display 813 is on or integrally part of a drapable substrate 811. The remote display device is itself drapable. The drapable display device 810 can be deformed into a three-dimensional shape and as such can be rolled or folded into a configuration for ease of carrying or wearing on the body. Drapable display 813 includes a cholesteric display disposed on or integrated with the drapable substrate 811. The drive electronics, power and control electronics as well as RF electronics for providing data to the remote display are located on the substrate 811. Such substrates include textiles or fabrics made of natural or man-made fibers such as cloth or paper, as well as non-fibrous materials such as flexible or even drapable polymeric sheets or films. With deformable substrates, cholesteric displays are made flexible, rugged and can even be sewn or otherwise fastened into or onto clothing to provide a wearable display. In fact, the display device itself can form the material used to make the clothing or other fabric construct. A remote cholesteric display with the drapability of cloth provides a new dimension to liquid crystal display technology enabling display applications that were not possible before such as conforming to three-dimensional structures or flexing and folding with the garment containing the display. To this end, the remote cholesteric display device according to the invention is operatively deformable, meaning that it will function even though it is or has been deformed. In preferred applications, the remote cholesteric display according to the invention will be operatively drapable such that it can have folds and possess a measurable drape coefficient. The formability of a fabric can be defined as its ability to re-form from a two-dimensional shape to a simple or complex three-dimensional shape. The drape coefficient is used to describe the degree of 3D deformation when the fabric specimen is draped over a drape meter as described in U.S. patent application Ser. No. 11/006,100. The display electrodes, cholesteric layer and associated components are coated, printed, formed and transferred, or laminated, and suitably patterned, on the drapable substrate in a manner disclosed in U.S. patent application Ser. No. 11/006,100. The display 813 is protected from environmental elements by the protective layer 812 and by the flexible display bezel 801. The remote display device 810 is one example of a remote display device formed without a solar cell in accordance with the present invention. Non-drapable remote displays without solar cells may also constitute the invention, such as the remote display 110 shown in FIGS. 1 and 2 without the solar cell and associated electronics.

Figure 9A:
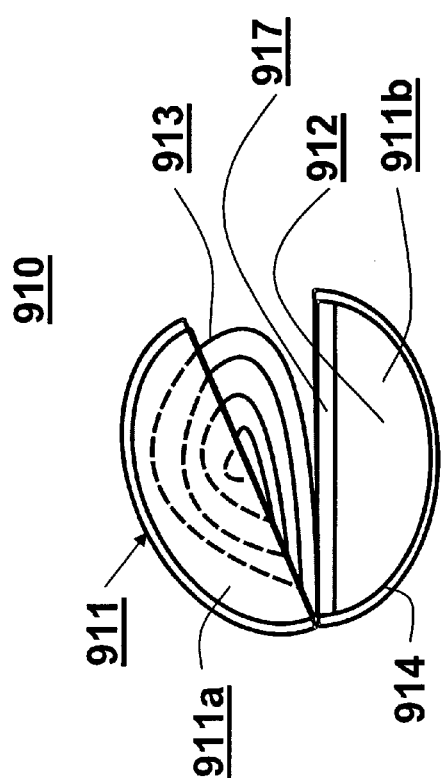
FIGS. 9A and 9B are illustrations of a drapable remote display stored in a clam shell container and expanded for viewing the display.
Figure 9B:
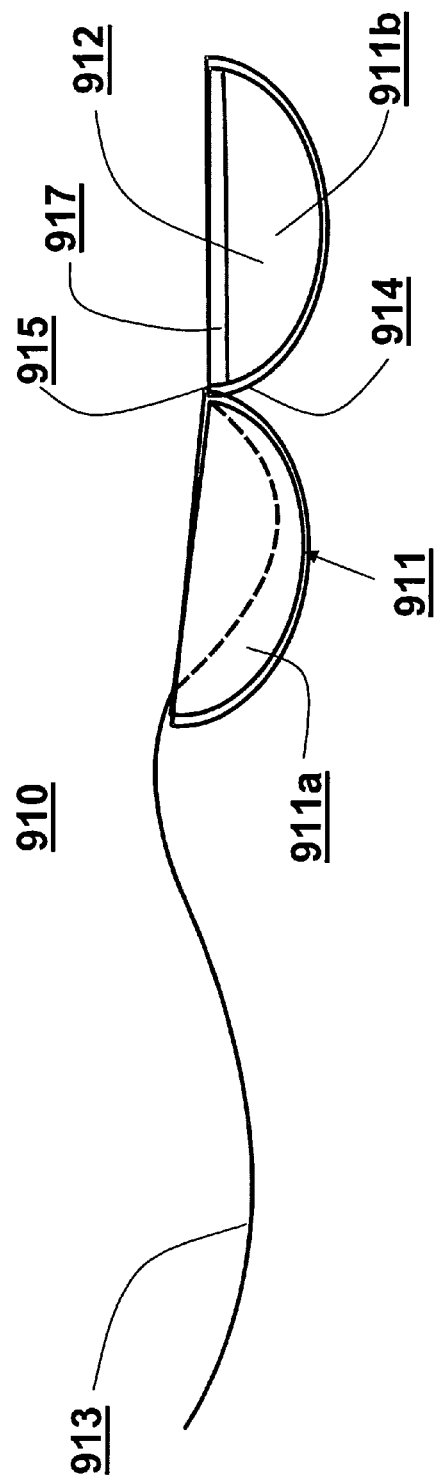

FIGS. 9A and 9B illustrate a remote bistable cholesteric display device 910 in which the drapable display screen 913 is on or integrally part of a drapable substrate. The remote display itself is drapable. FIG. 9A illustrates the display screen 913 rolled or folded into a configuration for ease of carrying in a mostly closed container or housing. FIG. 9B illustrates the display screen 913 in an unrolled or unfolded, extended configuration for viewing an image on the display when the container is open.

The drive electronics 912 for the passive matrix cholesteric drapable display are located in the exemplary clam shell container or housing 911. Container 911 includes two concave members 911a, 911b that pivot with respect to one another between open and closed positions about hinge 915. The electronic driving schemes can be of the conventional type (e.g., U.S. Pat. Nos. 5,644,330 or 5,625,477) or of the dynamic drive type (e.g., U.S. Pat. No. 5,748,277), incorporated herein by reference. Drive electronics 912 may be directly attached to the display screen 913 or may be connected through a cable or other electrical connection. It is to be understood that some or all of the drive and display control electronics may be printed or otherwise disposed on the substrate of the display screen 913. Power may optionally be supplied to the drapable display screen from a battery inside the container 911 that may be rechargeable from a solar panel source 914 that may cover all or part of the exemplary clam shell container. Electric power generated by the solar panel is collected by a power management circuit located in the container 911 and fed to a rechargeable battery not shown but also contained in container 911. Radio frequency electronics for a wireless connection to the exemplary cell phone mother device 120 are also located within container 911 and may be powered by the solar panel 914. An optional data input device 917 such as a keyboard or touch screen can be part of the remote display device 910 and positioned at various locations of the container.

Finally, FIG. 10 illustrates the inventive remote display device 1010 being body worn. A wireless connection with the exemplary cell phone mother device 1020 provides a link for digital data to be sent and received by the mother and remote devices. The body worn device 1010 may be a conformable, self-powered, flexible display as illustrated in FIGS. 1-7 or may be a drapable remote display as illustrated in FIGS. 8 and 9.

Many modifications and variations of the invention will be apparent to those of ordinary skill in the art in light of the foregoing disclosure. Therefore, it is to be understood that, within the scope of the appended claims, the invention can be practiced otherwise than has been specifically shown and described.

What is claimed is:

1. A display device for remotely connecting to a portable electronic communications device, said display device comprising:
   a bistable reflective cholesteric liquid crystal display including a layer of cholesteric liquid crystal material;
   an input interface for receiving data signals transmitted by the portable electronic communications device for displaying an image on said display device;
   a battery for powering said display device;

a layer of photovoltaic material provided under said layer of cholestric liquid crystal material and adapted to transform light received from said cholesteric display to electrical energy for powering said display device and for charging said battery; and an output interface for transmitting electrical power generated by said photovoltaic material to said portable communications device, wherein said layer of photovoltaic material generates sufficient electrical power to both provide electrical power to the display device and concurrently provide electrical power to said portable communications device while said display device is concurrently receiving said data signals from said portable communications device, and wherein said input interface and said output interface are remotely connected to respective interfaces of said portable communications device via a removable connection allowing said display device to be removed some distance from said portable communications device.

2. The device of claim 1 wherein said portable communications device is selected from the group consisting of a cell phone, electronic book, walkie-talkie, personal digital assistant, handheld computer, radio, MP3 player, global positioning device, camera and combinations thereof.

3. The device of claim 1, wherein said at least one removable connection comprises a cable for providing said electrical power to said portable communications device and a wireless link for wirelessly transmitting said data signals from said portable communications device.

4. The device of claim 1, wherein said remote display device comprises a touch pad, keyboard or voice recognition electronics adapted to enable inputting of information.

5. The device of claim 1, further comprising means for activating and deactivating power to one of said portable communications device and said remote display device responsive to signals transmitted from the other of said portable communications device and said remote display device.

6. The device of claim 1, wherein said remote display device comprises a data input device adapted to input information from a user and a transmitter adapted to wirelessly transmit signals containing said input information to said portable communications device.

7. The display device of claim 1, wherein said cholesteric display includes a passive matrix comprising spaced first and second layers of electrodes that are orthogonally arranged with respect to each other between which said cholesteric liquid crystal is disposed, and said drive electronics are adapted to apply the electric field to said cholesteric liquid crystal via said electrodes for producing the images on said cholesteric display.

8. The display device of claim 1, wherein said cholesteric display includes an active matrix comprising a plurality of pixel electronics near said cholesteric liquid crystal, and said drive electronics are adapted to apply the electric field to said cholesteric liquid crystal via said pixel electronics for producing the images on said cholesteric display.

9. The display device of claim 1, wherein said portable communications device is selected from the group consisting of a cell phone, electronic book, walkie-talkie, personal digital assistant, handheld computer, radio, MP3 player, global positioning device, camera and combinations thereof.

10. The display device of claim 1, further comprising means for activating and deactivating power to one of said portable communications device and said remote display device responsive to signals transmitted from the other of said portable communications device and said remote display device.

11. The display device of claim 1, wherein said display device includes a user interface, and wherein data signals transmitted from said display device to said portable electronic communications device include signals from said user interface.

12. The display device of claim 11, wherein said user interface of said display device is a touch screen integrated in said display device.

13. The display device of claim 11, wherein the photovoltaic material is integrated in the cholesteric display.

14. A display device for remotely connecting to a portable electronic communications device, said display device comprising a bistable reflective cholesteric liquid crystal display;

an input interface for receiving data signals transmitted by the portable electronic communications device for displaying an image on said display device;

a battery for powering said display device;

photovoltaic material provided underneath said cholestric liquid crystal display and adapted to transform light received through said cholesteric display to electrical energy for powering said display device and for charging said battery; and an output interface for transmitting electrical power generated by said photovoltaic material to said portable electronic communications device for powering and/or charging said portable electronic communication device, wherein said photovoltaic material generates sufficient electrical power to both provide electrical power to the display device and concurrently provide electrical power to said portable communications device, and wherein said input interface and said output interface are remotely connected to respective interfaces of said portable communications device via at least one cable for carrying said electrical power and at least one removable connection for carrying said data signals allowing said display device to be provided some distance from said portable communications device, and wherein said display device is adapted for providing electrical power to said portable electronic communication device while said image being displayed on said display device.

15. The display device of claim 14, wherein said display device further comprises a touch screen interface, and wherein data signals generated by said touch screen interface are transmitted from said display device to said portable electronic communications device.

16. The display device of claim 15, wherein said display with said photovoltaic material and with said touch screen is adapted to be flexible.

17. The display device of claim 14, wherein said display with said photovoltaic material is adapted to be flexible.

18. The display device of claim 1, wherein said layer of photovoltaic material absorbs light not reflected by said layer of cholesteric material.

19. The display device of claim 1, wherein said layer of liquid crystal material is provided between a pair of substrate layers, and wherein said layer of photovoltaic material is provided under the substrate layer provided under said liquid crystal layer.

20. The display device of claim 14, wherein said bistable reflective cholesteric liquid crystal display is comprised of a layer of liquid crystal material provided between a pair of substrate layers, and wherein said photovoltaic material is provided under the substrate layer provided under said liquid crystal layer.

21. The display device of claim 14, wherein said photovoltaic material absorbs light not reflected by said cholesteric display.

22. A display device for remotely connecting to a portable electronic communications device, said display device comprising:
a liquid crystal display including a layer of liquid crystal material;
an input interface for receiving data signals transmitted by the portable electronic communications device for displaying an image on said display device;
a layer of photovoltaic material adapted to transform light received through said display to electrical energy for powering said display device; and
an output interface for transmitting electrical power generated from said photovoltaic material to said portable electronic communications device, wherein
said layer of photovoltaic material generates sufficient electrical power to both provide electrical power to the display device and concurrently provide electrical power to said portable communications device while said display device is concurrently receiving said data signals from said portable communications device, and wherein
said input interface and said output interface are remotely connected to respective interfaces of said portable communications device via at least one removable connection, wherein said display device is adapted for providing electrical power to said portable electronic communication device while said image being displayed on said display device.

23. The display device of claim 22, wherein said layer of photovoltaic material is provided under said layer of liquid crystal material and absorbs light not reflected by said layer of liquid crystal material.

24. The display device of claim 23, wherein said liquid crystal material includes a bistable cholesteric liquid crystal material.

25. The display device of claim 22, wherein said liquid crystal material includes a bistable cholesteric liquid crystal material.

26. The display device of claim 22, wherein said layer of liquid crystal material is provided between a pair of substrate layers, and wherein said layer of photovoltaic material is provided under the substrate layer provided under said liquid crystal layer.

27. A display device comprising:
a bistable liquid crystal display including a layer of cholesteric liquid crystal material;
an input interface for receiving data signals from an external device for displaying an image on said display device;
a layer of photovoltaic material provided coplanar to said layer of liquid crystal material and adapted to transform light to electrical energy for powering said display device; and
an output interface for transmitting electrical power generated from said photovoltaic material to said external device, wherein
said layer of photovoltaic material generates sufficient electrical power to both provide electrical power to the display device and concurrently provide electrical power to said external device wherein, said display device is adapted for providing electrical power to said external device concurrent with said image being displayed on said display device, and wherein
said input interface and said output interface are remotely connected to respective interfaces of said external device via at least one removable connection allowing said display device to be provided some distance from said external device during operation.

28. The display device of claim 27, wherein said layer of liquid crystal material is provided between a pair of substrate layers, and wherein said layer of photovoltaic material is provided under the substrate layer provided under said liquid crystal layer.

29. The display device of claim 1, wherein said at least one removable connection is comprised of a cable removably connecting said display device to said portable communications device.

30. The display device of claim 29, wherein said cable is adapted to carry said electrical power from said display device to said remote communication device, and also to carry said data signals from said remote communications device to said display device.

31. The display device of claim 27, wherein said layer of photovoltaic material absorbs light not reflected by said layer of liquid crystal material.

32. The display device of claim 27, wherein said at least one removable connection is comprised of a cable removably connecting said display device to said portable communications device.

33. The display device of claim 32, wherein said cable is adapted to carry said electrical power from said display device to said remote communication device, and also to carry said data signals from said remote communications device and said display device.

34. The display device of claim 32, wherein said at least one removable connection is further comprised of a wireless connection for connecting said display device to said portable communications device for carrying said data signals.

35. A display device comprising:
a bistable liquid crystal display including a layer of cholesteric liquid crystal material for reflecting at least a portion of light transmitted through said device;
an input interface for receiving data signals from an external communication device for displaying an image on said display device, wherein said input interface is connected to an output interface of said external communication device via a removable communication channel;
a layer of photovoltaic material provided coplanar to said layer of liquid crystal material and adapted to transform light received through said display to electrical energy for powering said display device, wherein said layer of photovoltaic material absorbs light not reflected by said layer of liquid crystal material; and
an output interface for transmitting electrical power generated from said photovoltaic material to said external communication device, at least while said image is being displayed on said display device, wherein said output interface is connected to an input interface of said external communication device via an electrical cable; and
a user interface for receiving input from a user, wherein
said layer of photovoltaic material generates sufficient electrical power to both provide electrical power to the display device and concurrently provide electrical power to said external communications device.

36. The display device of claim 35, wherein said user interface is for controlling power transfer from said display device to said external communication device.

37. The display device of claim 35, wherein said user interface is for providing data signals to said portable communication device via said removable communication channel.

38. The display device of claim 37, wherein said user interface is a touch screen interface.

39. The display device of claim 35, wherein said removable communication channel is a wireless link.

* * * * *